United States Patent [19]

Brackbill

[11] 4,069,982
[45] Jan. 24, 1978

[54] ENGAGING AND DISTRIBUTING PADDLE FOR A MANURE SPREADER
[75] Inventor: Warren H. Brackbill, Paradise, Pa.
[73] Assignee: Sperry Rand Corporation, New Holland, Pa.
[21] Appl. No.: 742,976
[22] Filed: Nov. 18, 1976
[51] Int. Cl.² ............................................. B02C 18/18
[52] U.S. Cl. ................................... 241/291; 239/679; 241/101.7; 241/273.3
[58] Field of Search ............... 241/101.7, 273.3, 273.4, 241/277, 280, 291; 239/662, 679, 680

[56] References Cited
U.S. PATENT DOCUMENTS

| | | | |
|---|---|---|---|
| 1,090,293 | 3/1914 | Francis | 239/680 X |
| 2,240,720 | 5/1941 | Selhorst | 241/273.3 |
| 2,555,283 | 5/1951 | Barker | 241/280 X |
| 3,228,701 | 1/1966 | Smith et al. | 241/273.3 |

OTHER PUBLICATIONS
"New Idea Offers–Manure Spreaders", pp. 7-8.

Primary Examiner—Roy Lake
Assistant Examiner—Howard N. Goldberg
Attorney, Agent, or Firm—Frank A. Seemar; John B. Mitchell; Joseph A. Brown

[57] ABSTRACT

An improved paddle design for use on the beater mechanism of a manure spreader enables the spreader to satisfactorily handle a broader range of manure consistencies and to distribute the same over a more uniform and wide spread pattern. The paddle has a dished or cupped shape, is substantially symmetrical about its centerline, and includes a curved main body portion and integrally formed upper engaging and lower mounting portions. The upper portion has a curved shape similar to the main body portion and is inclined inwardly toward the axis of curvature of the main body portion, thus providing a concave working surface. The lower portion presents a planar surface for mounting the paddle on a beater shaft. The paddle, being symmetrical, can be used on either the left or right sides of a spreader.

9 Claims, 7 Drawing Figures

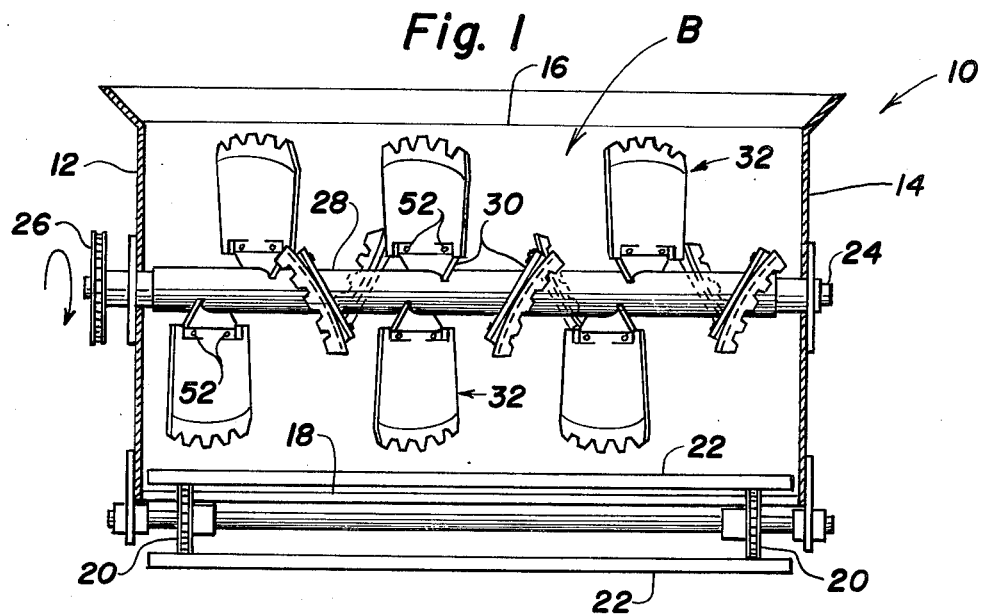
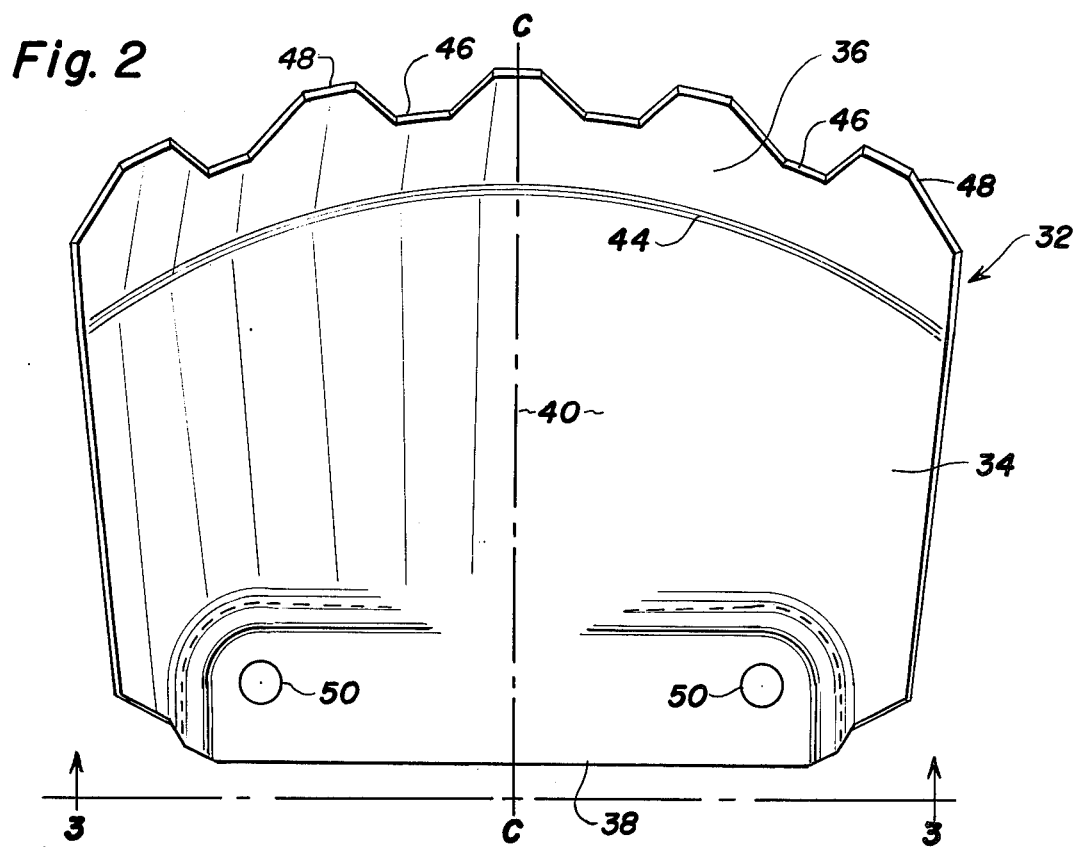
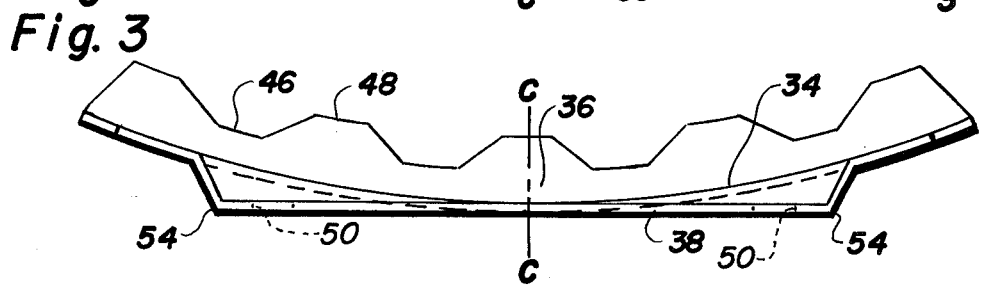

ENGAGING AND DISTRIBUTING PADDLE FOR A MANURE SPREADER

BACKGROUND OF THE INVENTION

1. Field of the Invention

The present invention relates generally to improvements in beater mechanisms for manure spreaders and the like, and more particularly, is directed to a new and improved paddle construction for a spreader beater.

2. Description of the Prior Art

One type of manure spreader on the market today employs a single beater located at the rear discharge end of a box-type spreader and has an array of flat sawtoothed paddles mounted on a rotatably transverse shaft which upon revolution, engages, tears, shreds and scatters the manure to the rear of the spreader. Generally, there are right and left hand paddles that are mounted at an oblique angle to the axis of revolution so that the manure is scattered to each side of the spreader as well as to the rear. Over the years, there have been various paddle designs directed to improving not only the tearing and shredding characteristic of these paddles but also toward achieving a wide uniformly distributed spread pattern.

Such single type beater spreaders have proven to be economical over the multi-beater spreaders and perform quite satisfactory in pen-type manure, manure characterized in containing a certain amount of bedding material therein and which is of a solidified nature. However, the modern trend in livestock operations has been toward the use of less bedding material, due to the cost of the bedding material itself and the cost and labor involved in handling and disposing of a larger bulk of manure, thus resulting in manure being of a soupy or sloppy state having a high moisture content (less solidified consistency).

Some livestock operators have tried their box-type manure spreaders which they use for their pen-type manure on this new sloppy manure and are disappointed in that the present day paddle beaters can not effectively and efficiently handle this more liquidfied manure. The present day beater paddle is just not designed to rapidly scoop up this sloppy manure and consequently, as a result, it requires more time to empty a given load of manure, and furthermore, the desired uniformity and the width of the spread pattern is not attainable.

The "tank-type" spreaders, which are common in the art today, were developed for handling the sloppy type manure. Although these tank type spreaders sufficiently handle the sloppy type manure, they require more power to operate and are generally more expensive than a box-type spreader of a comparable capacity. Furthermore, these tank type spreaders are generally limited to the handling of sloppy type manure and are not efficient in handling pen type manure.

SUMMARY OF THE INVENTION

Accordingly, it is the general purpose of the present invention to provide a new and improved paddle construction for use on the beater or beaters of a box-type spreader which can effectively and efficiently operate on all types of manure consistencies, both sloppy and pen type, and which is capable of achieving a wide, uniformly distributed, spread pattern. Further, the invention sets forth a unique design in a spreader paddle which enables the paddle to be used on either the left or right side of the perpendicular centerline of the beater shaft, thereby eliminating the trouble and expense of designated right and left hand paddles as are common in the art today. And still further, the present invention provides a spreader paddle adapted to be detachably mounted on new spreader models as well as for use on many of the spreaders existing in the market today.

In pursuance thereof, the present invention sets forth an improved paddle design for use on a manure spreader having a box-like structure with conveying means for moving material, such as manure, toward the rear discharge end wherein a beater mechanism engages, tears, shreds and spreads the advancing material in an uniformily distributed wide spread pattern to the sides and rear of the spreader. The beater mechanism generally includes a rotatably mounted shaft having an array or series of spreader paddles constructed in accordance with the principles of the present invention and mounted on the shaft so as to rotate therewith.

More particularly, the paddles are substantially symmetrical about a centerline and include a curved main body portion defining a concaved or dished shaped working surface, an upper portion integrally formed with the main body portion and of a similar shape, and a lower portion integrally formed with the main body portion and spaced below the upper portion for detachably mounting the paddle on a beater shaft.

The upper portion is inclined inwardly toward the axis of curvature of the main body portion and cooperates with the dished shaped main body portion in scooping up the rearwardly advancing material and scattering the same in a uniform distribution to the sides and rear of the spreader. Circumferentially spaced notches are defined in the upper edge portion, thereby providing aggressive teeth on the paddle which serve to tear and shred the advancing material.

The paddle's lower mounting portion provides a planar surface for detachably mounting the paddle on the beater shaft of new spreader models as well as on many of the existing models which are used in the industry today. The planar surface is generally tangent to the centerline of the paddle with its opposite outer ends being of equal distances from the axis of curvature of the main body portion such that the planar surface is substantially parallel to a plane that passes through two intersecting chord lines of the curved main body portion.

The improved paddle design provides a beater type open box manure spreader with the capability of effectively and efficiently handling manure of a broad range of consistencies, from the typical pen-type of manure having bedding material mixed therein to the more liquified or sloppy type of manure associated with the tank type spreaders. The cup or dish shaped main body portion in conjunction with the upper notched portion serves to scoop the manure from the spreader box and to retain the same on the working surface of the paddle for a longer period of time such that the manure is scattered in a wide spread pattern. Furthermore, the substantially symmetrical shape of the paddle serves not only the function of achieving a wider spread pattern of the sloppy type manure but also has the advantage of serving as either a right hand or left hand paddle, thereby reducing the cost of making, storing, and shipping separate right and left hand paddles, yet alone the confusion caused to operators and assemblers in mounting the paddles on the beater shaft. Still further, the shape of the lower mounting portion is highly advantageous in providing structural rigidity to the paddle.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be frequently made to the attached drawings in which:

FIG. 1 is an end elevational view looking into the rear discharge end of a manure spreader having spreader paddles constructed in accordance with the principles of the present invention.

FIG. 2 is an enlarged front elevational view of the spreader paddle of the present invention looking into the front working face of the paddle on a greatly enlarged scale over that of the paddles of FIG. 1.

FIG. 3 is a bottom plan view of the paddle as seen along line 3—3 of FIG. 2.

DETAILED DESCRIPTION OF THE INVENTION

Figure 4:
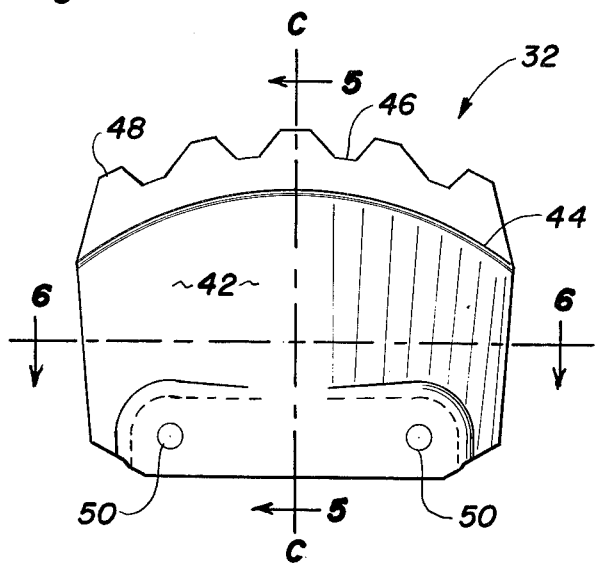
FIG. 4 is a rear elevational view of the paddle of FIG. 2, but on a smaller scale, looking at the rear or non-working face of the paddle.

In the following description, right hand and left hand references are determined by standing at the rear of the machine facing in a direction of forward travel. Also, in the following description, it is to be understood that such terms as "forward," "rearward," "left," "upwardly," etc., are words of convenience and are not to be construed as limiting terms.

IN GENERAL

Referring now to the drawings, and particularly to FIG. 1, there is shown a rear end view of a manure spreader, being indicated generally by the numeral 10, which incorporates the preferred embodiment of the present invention. While the present invention is illustrated in a manure spreader having a single beater mechanism and an apron conveyor it should be understood that the principles of the invention may just as readily be incorporated into any type of manure spreader or similar device.

The manure spreader 10 is conventional and of the open box-type structure including left and right side walls 12,14 respectively, a front wall 16 and a floor 18. An apron conveyor comprising chains 20 extending along opposite longitudinal side edges of the floor 18 carry transverse slats 22 for moving manure in a mass away from the front wall 16 rearwardly toward the rear discharge end of the spreader box.

Extending across the rear discharge end of the spreader box 10 is a beater B having shaft 24, the ends of which are rotatably journalled in the sidewalls 12,14. A sprocket 26 is provided on one end of the shaft 24 to be driven from a source of power, not shown, so as to rotate the beater B in the clockwise direction of the arrow of FIG. 1 as seen from the left side of the spreader. Affixed to the shaft 24 is a tube 28 which carries an array of mounting brackets 30 for detachably mounting the improved paddles 32, to be described in detail hereinafter. The brackets 30 are angularly disposed along the longitudinal axis of tube 28 with the ones on the left side of the spreader being reversed to the ones on the right side such that the paddles 32 extend oblique to an imaginery cylinder described by revolution of the paddles. Such angular disposition of the paddles is well known in the art and thus forms no part of this invention. The novel features of this invention resides in the paddles 32 themselves which will now be discussed in detail.

IMPROVED PADDLE DESIGN

According to the principles of the present invention, each paddle 32 is of a unitary structure and generally comprises a main body portion 34, a upper edge portion 36 and a lower mounting portion 38. Further, the paddle 32, and thus its components 34,36 and 38, are symmetrical about the centerline c—c.

As seen in FIGS. 2–7, the main body portion 34 is curved, preferably being a part of a cylindrical wall having a predetermined radius of curvature. The shape of the main body portion 34 forms a concave-shaped front working face 40, as seen in FIG. 2, and a convex-shaped rear non-working face 42 as seen in FIG. 4. It should be pointed out here that the specific radius of curvature depends upon the size of the paddle and its position on the beater shaft 24, the position of the beater shaft 24 relative to the rear discharge end of the spreader 10, and the speed of revolution at which the paddle 32 will be moved. It has been determined from experimentation that a radius of curvature between the range of 16–20 inches, preferably 18 inches, has produced very satisfactory results. Furthermore, it should be understood that in keeping with the principles of the present invention, the main body portion 34 need not be a part of a cylindrical wall having a constant radius but could also be part of an elliptical wall wherein the centerline c—c divides the main body portion 34 as well as the paddle itself into two equal portions.

Figure 5:
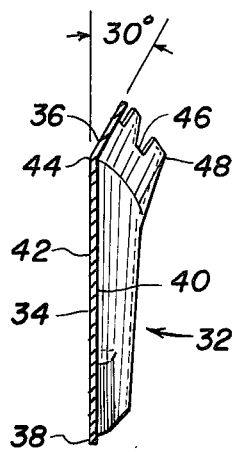
FIG. 5 is a vertical sectional view of the paddle taken along its centerline as represented by section lines 5—5 of FIG. 4.

Integrally formed with the main body portion 34 is the upper edge portion 36 which is also curved, preferably, having a curved shape similar to that of the main body portion 34. In the preferred embodiment, the upper edge portion 36 has a radius of curvature substantially equal to the radius of curvature of the main body portion 34. As best seen in FIG. 5, the upper portion 36 is inclined inwardly toward the axis of curvature of the main body portion 34 such that the integral interconnection of the main body and upper edge portions forms an arcuate-shaped crease as designated by the numeral 44. From testing and experimentation, it has been found that the most satisfactory spreading and distributing characteristics are achieved when the angle of inclination is between the range of 20°–40°, preferably 30° as shown in FIG. 5. In other words, the axis of curvature of the main body portion 34 intersects the axis of curvature of the upper edge portion 36 at approximately 30°.

It can be seen from the description of the paddle 32 that its shape takes on a cupped or scooped configuration symmetrical about centerline c—c and thus provides a dished working face which is adapted to scoop up the material, especially the more liquidified or sloppy manure as the same is advanced rearwardly by the apron conveyor.

Circumferentially spaced notches 46 are defined on the peripheral edge of the upper portion 36, thus forming peripheral teeth portions 48 which tend to tear and shred any clumps of material, such as found in pen-type manure, into smaller particles whereby the material can be spread more evenly over the ground. The inner boundary of the notched sector of the upper edge portion 36 is spaced from the top edge of the main body portion 34 (crease 44) and thus provides a continuous extension of the working face 42. Furthermore, to obtain a uniform spread characteristic as well as equal wear on the teeth 48, the outer peripheral edge of the upper edge portion 36 defines an arcuate shaped boundary substantially parallel to the arcuate shaped crease 42 formed by the intersection of main and upper body portions 34,36 respectively.

As mentioned earlier, the tube 28 is affixed to shaft 24 to rotate therewith and the brackets 30 are angularly displaced along the tube 28 to rotate about the axis of shaft 24 as the shaft 24 and tube 28 are rotated. The brackets 30 wrap around tube 28 and are fixed thereto, generally by welding, and further, are so shaped to present an upper planar mounting surface for detachably mounting a spreader paddle. Such arrangement is quite common and exists on many of the spreader models on the market today. Thus, the paddle 32 of the present invention is configured so that its lower mounting portion 38 will mate with the planar mounting surface of the mounting bracket 30, thereby providing a paddle which can be used on existing spreader models as well as new models.

Therefore, the paddle 32 is provided with a lower mounting portion 38 integrally formed on the lower end of the main body portion 34 and shaped to present a generally planar surface for mating engagement with the planar surface of the mounting bracket 30. Preferably, the planar surface takes on a rectangular shape with rounded upper corners, as best seen in FIGS. 2 and 4, and is also symmetrical about centerline c—c. A pair of mounting holes 50 are defined in the planar surface of the lower mounting portion 38 (one on each side of centerline c—c) for mounting the paddle 32 by fastener elements 52 on the bracket 30, see FIG. 1. In reference to FIG. 6, the lower mounting portion 38 is substantially tangent to the main body portion 34. More specifically, the plane that passes through the planar surface of the lower mounting portion 38 is generally tangent and perpendicular to a plane that passes through the axis of curvature of the main body portion 34 and the centerline c—c of the paddle 32. Still more specifically, the plane through the planar surface of the lower mounting portion 38 is generally parallel to a plane that passes through the opposite edges of the main body portion 34 of paddle 32.

Figure 6:
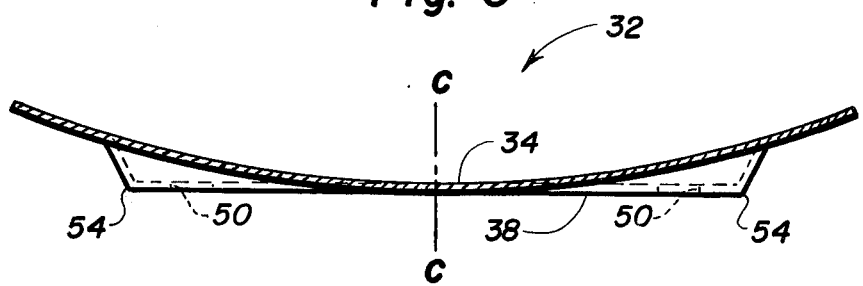
FIG. 6 is a sectional view taken along line 6—6 of the paddle of FIG. 4 but on a somewhat larger scale.
Figure 7:
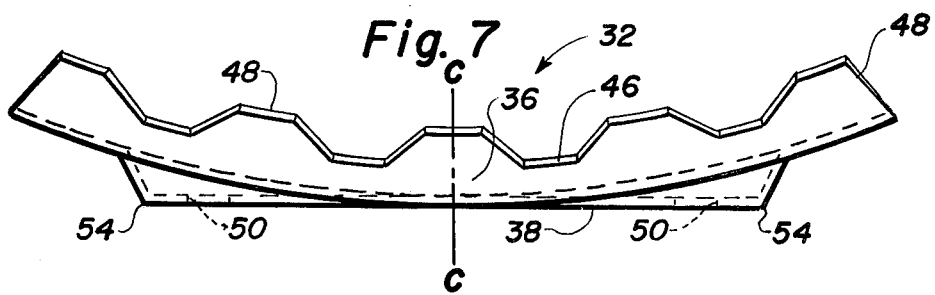
FIG. 7 is a top plan view of the paddle shown in FIG. 4, but on a somewhat larger scale, looking down from the upper or top edge portion of the paddle.

As best seen in FIGS. 3, 6 and 7, the integral connection of the outer boundaries of the planar surface and the curved surfaces of the lower mounting portion 38 form or arcuate shaped corner or web portions 54 which add structural rigidity to the paddle 32. It can be thus appreciated that the shape of the lower mounting portion 38 allows the paddle 32 to be snugly attached to the bracket 30 in a secure manner without deforming the shape of the upper portions of the paddle.

The above-described paddle construction has proven in actual practice to satisfactorily operate on a broader range of manure consistencies (from the sloppy to the pen-type manure) and to spread and distribute the same over a more uniform and considerably wider area than previously known paddle constructions for a given speed of operation and at no noticeable increase in driving power requirements. Further, the symmetrical shape of the paddle 32 allows its use on either the right or left side of the spreader and thus eliminates the problems and expense associated with designated right and left handle paddles. Still further, the unique shape of the paddle 32 decreases the amount of time required to unload a given load of manure, especially the more sloppy type. The dished or concave working face 40 tends to scoop up the material and because of the curved shape of the main body and upper portions, the material stays in contact with the paddle 32 for a longer period of time, thus increasing the momentum at which the material will be distributed.

It is thought that the invention and many of its attendant advantages will be understood from the foregoing description and it will be apparent that various changes may be made in form, construction and arrangement of parts of the improved paddle construction without departing from the scope of the invention or sacrificing all of its material advantages, the form hereinbefore described being merely an exemplary embodiment thereof.

Having thus described the invention, what is claimed is:

1. A material engaging and distributing paddle, comprising an inwardly curved main body portion and an inwardly curved upper peripheral edge portion integrally formed with the main body portion and curved inwardly along the same axis of curvature as said main body portion, said upper edge portion further being inclined toward said axis of curvature of said main body portion, said paddle having a centerline about which said main body and upper edge portions are substantially symmetrical.

2. The paddle as described in claim 1, wherein the upper peripheral edge portion and the main body portion are of substantially equal curvatures.

3. The paddle as described in claim 1, wherein the upper peripheral edge portion is notched.

4. A material engaging and distributing paddle comprising a curved main body portion having a first predetermined radius of curvature, a curved upper edge portion having a second predetermined radius of curvature and integrally formed with the main body portion, and a lower planar generally rectangular shaped mounting portion integrally formed with the main body portion for detachably mounting said paddle on a mounting shaft, said upper edge portion being inclined inwardly toward the axis of curvature of said main body portion.

5. The paddle as described in claim 4, wherein the radius of curvature of the main body portion and the upper edge portion are substantially equal.

6. The paddle as described in claim 4, wherein the radius of curvature of said main body portion is between 16 and 20 inches.

7. The paddle as described in claim 4, wherein said lower mounting portion is substantially tangent to a perpendicular plane that bisects the paddle in generally two equal portions.

8. A symmetrically shaped material engaging and distributing paddle comprising a curved main body portion and an upper peripheral edge portion integrally formed with the main body portion and curved inwardly along the axis of curvature of said main body portion, said upper peripheral edge portion and said main body portion forming an arcuate shaped crease at their integral connection, said upper edge portion being inclined inwardly along said crease.

9. The paddle as described in claim 8, wherein the outer edge of said upper peripheral edge portion defines an arcuate shaped boundary generally parallel to said arcuate shaped crease.

* * * * *